United States Patent Office 3,679,561
Patented July 25, 1972

3,679,561
TREATMENT OF ETHYLENE UNSATURATED ACID ESTER COPOLYMER WITH ALKALINE MEDIUM
Francis R. Galiano and Wayne E. Smith, Overland Park, Kans., assignors to Gulf Research & Development Company, Pittsburgh, Pa.
No Drawing. Filed June 22, 1970, Ser. No. 48,511
Int. Cl. C08f 27/00
U.S. Cl. 204—159.15          15 Claims

ABSTRACT OF THE DISCLOSURE

Without changing the physical form of the ethylene copolymer, the pendant ester groups of an ethylene copolymer are converted to the salt form by introducing an article of manufacture having a surface comprising a crosslinked ethylene polymer containing pendant ester groups into an aqueous medium maintained at an elevated temperature, said aqueous medium containing an inorganic alkali or alkaline earth metal salt.

BACKGROUND OF INVENTION

Ethylene copolymers wherein the comonomer is vinyl acetate or an ester of acrylic, maleic, fumaric, or itaconic acid are conventionally prepared by the high pressure, free-radical polymerization of ethylene and the copolymer. Such high pressure, free-radical polymerizations are continuous processes normally conducted in an autoclave or tubular type reactor. A suitable method for preparing such copolymers is described in U.S. 3,350,372. The ethylene copolymer so prepared can readily be fabricated into various forms such as films, containers, ice cube trays, and the like by conventional extrusion and molding techniques known to the art.

In many commercial applications, ethylene polymers containing functional carboxyl, amide and carboxylate groups are required to provide particular characteristics. Such functional groups can be obtained by processes such as the hydrolysis process described in U.S. 3,485,785. As described therein, ethylene-alkyl acrylate copolymers are hydrolyzed by the action of a metallic base in an aqueous medium at elevated temperatures to provide, in one embodiment, an ethylene polymer containing pendant carboxylate groups. Although high molecular weight copolymers of ethylene and polar vinyl monomers such as those containing reactive functional groups such as hydroxyl and carboxyl have been prepared directly by high pressure polymerization techniques, such processes are difficult to operate and the comonomer concentration of the product copolymers is low.

From the above, it is apparent that conventional processes for the production of high molecular weight copolymers of ethylene and ester monomers containing reactive carboxylate and amide functional groups normally involve two distinct and separate processes: (1) copolymerization of ethylene and the ester monomer, and (2) conversion of the ester groups to reactive functional groups. In the conversion of the ester groups to the functional carboxylate groups, the physical form of the ethylene-ester copolymer is changed. For example, in the hydrolysis process described in U.S. 3,249,570, the ethylene-alkyl acrylate copolymer is dispersed in an aqueous medium at a temperature in excess of 180° C. and therein reacted with a metallic base such as an alkali metal hydroxide. The product obtained is a shelf-stable, aqueous dispersion of the ethylene polymer. The ethylene polymer can be recovered from the aqueous dispersion by conventional coagulation techniques. To effect conversion of the ester groups to the carboxylate salt form it has been necessary to change the physical form of the ethylene-alkyl acrylate copolymer.

The ethylene copolymers wherein the comonomer comprises vinyl acetate or an ester of acrylic, maleic, fumaric or itaconic acid are more readily fabricated into various shapes and forms than those ethylene copolymers containing pendant carboxylate salt functional groups. Therefore, desirably conversion of pendant ester groups to the functional carboxylate or amide groups would be effected only after fabrication of the ethylene copolymer had been completed.

Accordingly, an object of the invention is to provide an improved process for the conversion of pendant ester groups of an ethylene copolymer to the carboxylate salt form.

Another object of the invention is to provide an improved process for the conversion of pendant ester groups of an ethylene copolymer to the carboxylate salt and amide form.

Yet another object of the invention is to provide a process for the conversion of pendant ester groups of an ethylene polymer to the carboxylate salt and amide form, said ethylene polymer comprising the surface of an article of manufacture.

A further object of the invention is to provide a process for the conversion of pendant ester groups of an ethylene polymer to carboxylate salt and amide form wherein said ethylene polymer forms at least the surface of an article of manufacture, said conversion conducted without changing the physical form of the article of manufacture.

Other objects, advantages and features of this invention will be readily apparent to those skilled in the art from the following description and the appended claims.

SUMMARY OF INVENTION

By the invention pendant ester groups of an ethylene polymer comprising at least the surface of an article of manufacture are converted to the carboxylate salt and amide form by subjecting the ethylene polymer to a crosslinking action, thereafter introducing the article of manufacture containing the crosslinked ethylene polymer surface into an aqueous medium maintained at an elevated temperature, said aqueous medium containing an inorganic alkali or alkaline earth metal salt and, optionally, a nitrogenous base, and recovering therefrom the article of manufacture in the same form as introduced into the aqueous medium.

DESCRIPTION OF INVENTION

The invention is applicable to articles of manufacture wherein at least the surface of the article of manufacture comprises an ethylene copolymer wherein the comonomer is vinyl acetate or an ester of acrylic, methacrylic, maleic, fumaric, or itaconic acid. The ethylene copolymer can comprise only the surface of the article of manufacture, being bonded to the substrate by conventional methods of application, or the article of manufacture can be fabricated entirely from the ethylene copolymer such as in the case of films. The invention is equally applicable to articles of manufacture prepared by coating, molding, extrusion processes and the like.

The ethylene copolymers of the invention are those ethylene polymers wherein the concentration of the comonomer is in the range of 0.01 to 0.5 mol per mol of contained ethylene. The invention is particularly applicable to articles of manufacture wherein the surface of the article of manufacture comprises an ethylene copolymer having a comonomer concentration of 0.05 to 0.25 mol per mol of contained ethylene.

In the practice of the invention, the ethylene copolymer is crosslinked prior to conversion of the pendant ester groups to the salt form. Conventional methods for crosslinking the ethylene copolymer can be employed. The crosslinking action converts the ethylene polymers to relatively insoluble, less thermoplastic polymers. One conventional method of crosslinking involves electron bombardment of the polymers. Other methods proposed in the art are characterized primarily by the incorporation of a free radical-liberating substance into the solid polymer followed by the application of heat. Such free radical-liberating substances include the organic peroxides such as dicumyl peroxide and benzoyl peroxide, and various nitrogen-containing compounds. Certain di(aralkyl) peroxides have been found to be particularly effective in crosslinking ethylene polymers.

As noted above, crosslinking of the ethylene polymer converts the polymer to a relatively insoluble thermoplastic polymer. As employed herein, the term crosslinked polymer refers to those ethylene polymers which have been crosslinked to the extent that such polymers are substantially insoluble in Tetralin.

The preferred method of crosslinking the ethylene polymers which have been fabricated to form articles of manufacture is to subject the ethylene copolymer surface of the article of manufacture to electron bombardment. For purposes of the invention it has been found that the ethylene copolymer surface of articles of manufacture can be effectively irradiated to provide a crosslinked polymer by using ionizing radiation of the class consisting of accelerated electrons, gamma rays, and X-rays, employing a radiation dose in the range of 3 to 10 megarads. Preferably, a radiation dose in the range of 5 to 8 megarads is employed.

In one embodiment of the invention, an extruded film of the ethylene copolymer which has been crosslinked to provide a film insoluble in Tetralin is introduced into an aqueous medium maintained at an elevated temperature of at least 50° C. The aqueous medium comprises a solution of an inorganic alkali or alkaline earth metal salt with the concentration of the salt comprising from 0.1 to 50 weight percent of the aqueous medium. Sodium and potassium hydroxides have been found to be particularly effective in the practice of the invention.

The film is maintained in the aqueous medium for a period of time of at least one minute. By maintaining the film in the aqueous medium for one minute, at least the pendant ester groups of the surface layer of the ethylene copolymer are converted to the salt form. It will be appreciated by those skilled in the art that for complete conversion of all of the ester groups present in the ethylene copolymer film, if such complete conversion is desired, it may be necessary to maintain the film in the aqueous medium for longer periods of time.

Following conversion of the ester groups to the salt form, the ethylene copolymer film is withdrawn from the aqueous medium. A comparison of the film introduced into the aqueous medium and the film withdrawn from the aqueous medium shows that there has been no substantial change in the physical form of the film, that is to say that the size and shape of the article of manufacture introduced into the aqueous medium and withdrawn from the aqueous medium is substantially the same. The pendant ester groups of at least the surface of the ethylene copolymer film withdrawn from the aqueous medium have been converted to the salt form.

In a second embodiment of the invention, the aqueous medium can contain, in addition to the inorganic salt, a nitrogenous base such as ammonia and organic quaternary nitrogenous bases such as choline and primary and secondary amines such as the low mono- and dialkylsubstituted amines to include methylamine, ethylamine, isopropylamine, diethylamine, ethanolamine and octylamine. The concentration of the nitrogenous base in the aqueous medium is in the range of 0.1 to 90 weight percent of the aqueous medium. The total of the nitrogenous base and inorganic salt added to the aqueous medium will not exceed 90.1 weight percent of the aqueous medium.

Upon introducing the crosslinked ethylene copolymer film into the aqueous medium containing the nitrogenous base and inorganic salt, portions of the pendant ester groups are converted to the salt and amide form. As in the case of the first embodiment, the film withdrawn from the aqueous medium is in substantially the same physical form as the film introduced into the aqueous medium. The reaction temperature, time of the reaction and concentration of the inorganic salt in the aqueous medium are as described with respect to the first embodiment.

The following examples are presented to illustrate the advantages and features of the invention. It is not intended, however, to limit the invention to the specific embodiment described therein.

Example 1

An ethylene-methyl acrylate copolymer film (350 grams) containing 20 weight percent methyl acrylate which had been irradiated to the extent of 6.5 megarads, was charged to a one gallon Magna-drive reactor containing 900 ml. of water, 700 ml. of concentrated ammonium hydroxide and 12.3 grams of sodium hydroxide. The reactor was purged with nitrogen and heated to 250° C. and maintained at that temperature for 6 hours. After cooling, the product was removed from the reactor as a film.

An infrared spectrum of the product showed bands characteristic of carboxylate and carboxamide groups. Absorption bands in the ester region were absent, indicating complete conversion of the pendant ester groups.

Example 2

Example 1 was repeated employing 210 grams of a non irradiated ethylene-methyl acrylate (20 weight percent methyl acrylate) film, 900 ml. of water, 700 ml. of concentrated ammonium hydroxide and 7.3 grams of sodium hydroxide. The product of this run was an emulsion and the infrared spectrum again showed complete conversion of the ester function.

The above examples demonstrate the effectiveness of the invention to convert pendant ester groups of the ethylene polymer to carboxylate and amide form without changing the physical form of the article of manufacture comprising the ethylene polymer.

Although the invention has been described with reference to specific materials, embodiments and details, various modifications and changes, within the scope of this invention, will be apparent to one skilled in the art and are contemplated to be embraced in the invention.

What is claimed is:

1. A process which comprises introducing an article of manufacture having a surface comprising a crosslinked ethylene polymer into an aqueous alkaline medium maintained at an elevated temperature of at least 50° C., said crosslinked ethylene polymer having been prepared by crosslinking a polymer crosslinked with organic peroxides or ionizing radiation consisting essentially of ethylene and a comonomer selected from the group consisting of vinyl acetate and the esters of acrylic, methacrylic, maleic, fumaric, and itaconic acids, the concentration of said comonomer in said ethylene polymer being in the range of 0.01 to 0.5 mol per mol of contained ethylene, maintaining a concentration of an inorganic alkali or alkaline earth metal salt in the range of 0.1 to 50 weight percent in said aqueous medium, maintaining said crosslinked polymer in said aqueous medium for at least one minute, and withdrawing from said aqueous medium said article of manufacture in substantially the same form as introduced into said aqueous medium, said article of manufacture having a surface of an ethylene polymer wherein the pendant ester groups have been converted to the salt form.

2. The process of claim 1 to include maintaining a concentration of a nitrogenous base in said aqueous medium in the range of 0.1 to 90 weight percent, said nitrogenous base selected from the group consisting of ammonia, choline, primary amines and secondary amines, and recovering from said aqueous medium an article of manufacture in the same form as introduced into said aqueous medium, said article of manufacture having a surface of an ethylene polymer wherein at least a portion of the pendant ester groups have been converted to the salt form and a portion of the pendant ester groups have been converted to the amide form.

3. The process of claim 2 wherein said nitrogenous base is ammonia.

4. The process of claim 1 wherein said inorganic salt is an alkali metal salt selected from the group consisting of sodium and potassium hydroxides.

5. The process of claim 3 wherein said inorganic salt is selected from the group consisting of sodium and potassium hydroxides.

6. A process which comprises introducing a film layer of a crosslinked ethylene polymer into an aqueous alkaline medium maintained at an elevated temperature of at least 50° C., said crosslinked ethylene polymer having been prepared by crosslinking a polymer crosslinked with organic peroxides or ionizing radiation consisting essentially of ethylene and a comonomer selected from the group consisting of vinyl acetate and the esters of acrylic, methacrylic, maleic, fumaric, and itaconic acids, the concentration of said comonomer in said ethylene polymer being in the range of 0.01 to 0.5 mol per mol of contained ethylene, maintaining a concentration of an inorganic alkali or alkaline earth metal salt in the range of 0.1 to 50 weight percent in said aqueous medium, maintaining said crosslinked ethylene polymer in said aqueous medium for at least one minute, and withdrawing from said aqueous medium an ethylene polymer film layer wherein the pendant ester groups have been converted to the salt form.

7. The process of claim 6 to include maintaining a concentration of a nitrogenous base in said aqueous medium in the range of 0.1 to 90 weight percent, said nitrogenous base selected from the group consisting of ammonia, choline, primary amines and secondary amines, and recovering from said aqueous medium an article of manufacture in the same form as introduced into said aqueous medium, said article of manufacture having a surface of an ethylene polymer wherein at least a portion of the pendant ester groups have been converted to the salt form and a portion of the pendant ester groups have been converted to the amide form.

8. The process of claim 6 wherein said ethylene polymer is crosslinked by irradiation.

9. The process of claim 1 wherein said ethylene polymer is crosslinked by irradiation.

10. The process of claim 6 wherein said ethylene polymer introduced into said aqueous medium comprises an ethylene-alkyl acrylate copolymer.

11. The process of claim 1 wherein said ethylene polymer introduced into said aqueous medium comprises an ethylene-alkyl acrylate copolymer.

12. The process of claim 10 wherein said inorganic salt is selected from the group consisting of potassium and sodium hydroxides.

13. The process of claim 11 wherein said inorganic salt is selected from the group consisting of sodium and potassium hydroxides.

14. The process of claim 7 wherein said ethylene polymer introduced into said aqueous medium comprises an ethylene-alkyl acrylate copolymer.

15. The process of claim 14 wherein said inorganic salt is selected from the group consisting of sodium and potassium hydroxides and wherein said nitrogenous base is ammonia.

References Cited

UNITED STATES PATENTS

| | | | |
|---|---|---|---|
| 2,581,832 | 1/1952 | Blume | 260—91.3 |
| 2,649,439 | 8/1953 | Brown | 260—89.5 S |
| 3,259,688 | 7/1966 | Towne | 174—107 |
| 3,485,785 | 12/1969 | Anspon | 260—29.6 |
| 3,567,488 | 3/1971 | Rathsack | 117—47 |
| 3,567,489 | 3/1971 | Rathsack | 117—47 |

JOSEPH L. SCHOFER, Primary Examiner

C. A. HENDERSON, Jr., Assistant Examiner

U.S. Cl. X.R.

204—159.16; 260—78.5 HC, 86.7, 87.3